(12) United States Patent
Neumeier (10) Patent No.: US 9,616,574 B2
(45) Date of Patent: Apr. 11, 2017

(54) PLASMA-SEALANT WOBBLE PADDLE

(71) Applicant: Honda Motor Co., Ltd., Minato-ku, Tokyo (JP)

(72) Inventor: Samuel J. Neumeier, Troy, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 13/971,097

(22) Filed: Aug. 20, 2013

(65) Prior Publication Data

US 2015/0053343 A1 Feb. 26, 2015

(51) Int. Cl.
*B32B 38/00* (2006.01)
*B25J 11/00* (2006.01)

(52) U.S. Cl.
CPC .................... *B25J 11/00* (2013.01)

(58) Field of Classification Search
CPC ....... B29C 66/80; B32B 38/0008; B05D 3/00; B05D 3/06; B05D 3/068; B05D 3/14; B05D 3/141; B05D 3/142; B05D 3/144
See application file for complete search history.

(56) References Cited

U.S. PATENT DOCUMENTS

| 6,197,115 | B1 | 3/2001 | Barrey et al. |
| 7,043,815 | B2 | 5/2006 | Lande et al. |
| 7,112,246 | B2 | 9/2006 | Schucker |
| 7,467,452 | B2 | 12/2008 | Lande et al. |
| 8,361,565 | B2 | 1/2013 | Kuhlenschmidt et al. |
| 2002/0093757 | A1* | 7/2002 | Daniel ............... G11B 33/1466 360/99.22 |
| 2002/0096839 | A1* | 7/2002 | Schmidt ............. B60R 13/0815 277/650 |
| 2005/0066890 | A1 | 3/2005 | Wetzel |
| 2006/0127584 | A1 | 6/2006 | Lande et al. |
| 2006/0172081 | A1* | 8/2006 | Flinn et al. .................... 427/532 |
| 2008/0268164 | A1 | 10/2008 | Thayer et al. |

(Continued)

FOREIGN PATENT DOCUMENTS

WO 2010091086 A1 8/2010

OTHER PUBLICATIONS

PCT International Search Report; Date of Mailing: Nov. 25, 2014; International Application No. PCT/US2014/046992; International Filing Date: Jul. 17, 2014; Applicant: Honda Motor Co., Ltd. et al; Date of Actual Completion of International Search: Nov. 25, 2014; Date of Mailing of International Search Report: Nov. 25, 2014.

*Primary Examiner* — Daniel McNally
(74) *Attorney, Agent, or Firm* — Arent Fox LLP (57) ABSTRACT

An apparatus is configured to process a work piece and includes a robotic arm, a sealant discharger, and a plasma discharger. The robotic arm includes a distal end that is rotatable with respect to an axis of the robotic arm. The sealant discharger includes a sealant outlet configured to discharge sealant while the sealant outlet is at a first point. The sealant discharger is mounted on the distal end such that the first point is located on the axis. The plasma discharger includes a plasma outlet configured to discharge plasma while the plasma outlet is at a second point that is located a distance apart from the axis. The plasma discharger is mounted on the distal end such that the second point is rotatable around the axis.

20 Claims, 5 Drawing Sheets

(56) References Cited

U.S. PATENT DOCUMENTS

2011/0282492 A1\* 11/2011 Krause .................. B25J 9/1664
700/259
2012/0295034 A1\* 11/2012 Link ....................... B29C 44/56
427/488
2013/0040151 A1 2/2013 Jeromerajan et al.

\* cited by examiner

PLASMA-SEALANT WOBBLE PADDLE

BACKGROUND

The present disclosure relates to apparatuses and methods of assembling components and, more particularly, apparatuses and methods of cleaning and applying substances on components prior to assembly.

In an assembly line in which components are handled, robots are generally used to handle components of various shapes. It is often necessary to program the robot to be aware of the shape of the components and to tailor the movement of the robot to such a shape. Such an operation may involve applying a type of substance (e.g., paint, sealant) on the component, inserting bolts/screws into holes of the component, or the like. In conducting these processes, it can be difficult to program the robot to be aware of the complex shapes of the components, and methods and apparatuses that can facilitate this process are useful.

SUMMARY

In a first example, an apparatus is configured to process a work piece. The apparatus includes a robotic arm, a sealant discharger, and a plasma discharger. The robotic arm includes a distal end that is rotatable with respect to an axis of the robotic arm. The sealant discharger includes a sealant outlet configured to discharge sealant while the sealant outlet is at a first point. The sealant discharger is mounted on the distal end such that the first point is located on the axis. The plasma discharger includes a plasma outlet configured to discharge plasma while the plasma outlet is at a second point that is located a distance apart from the axis. The plasma discharger is mounted on the distal end such that the second point is rotatable around the axis.

In a second example, a method of processing a work piece using a robotic arm is provided. The robotic arm includes a distal end that is rotatable with respect to an axis of the robotic arm. The robotic arm includes a plasma discharger and a sealant discharger mounted to the distal end. The plasma discharger includes a plasma outlet configured to discharge plasma. The sealant discharger includes a sealant outlet configured to discharge sealant. The work piece includes a surface. The method includes a step of positioning the plasma discharger and the sealant discharger such that the sealant outlet is located at a first point which in proximity to the surface and the plasma outlet is located at a second point which is in proximity to the surface. The first point defines a discharge point for the sealant. The second point defines a discharge point for the plasma. The first point is positioned on the axis and the second point is rotatable around the axis. The method further includes a step of moving the distal end such that the axis is moved along a predetermined path on the surface while discharging sealant from the first point so as to apply sealant on the surface. The method further includes a step of pivoting the distal end such that the second point traces the predetermined path during the step of moving while discharging the plasma such that the plasma is applied on the surface along the predetermined path. The second point traces the predetermined path ahead of the first point along an entirety of the predetermined path.

In a third example, a method of processing a work piece including a surface is provided. The method includes a step of discharging sealant from a first point along an axis that is oriented perpendicularly to the surface. The first point is in proximity to the surface such that the sealant is applied on the surface. The method further includes a step of discharging plasma from a second point that is located a distance apart from the axis. The second point is in proximity to the surface such that plasma is applied on the surface. The method further includes moving the axis while discharging the sealant such that the sealant is applied on the surface along a predetermined path thereon. The method further includes pivoting the second point around the axis while discharging the plasma during the step of moving such that the second point is moved along the predetermined path and the plasma is applied on the surface along the predetermined path. The second point traces the predetermined path ahead of the first point along an entirety of the predetermined path.

BRIEF DESCRIPTION OF THE DRAWINGS

These and other aspects are better understood when the following detailed description is read with reference to the accompanying drawings, in which.

DETAILED DESCRIPTION

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Figure 1:
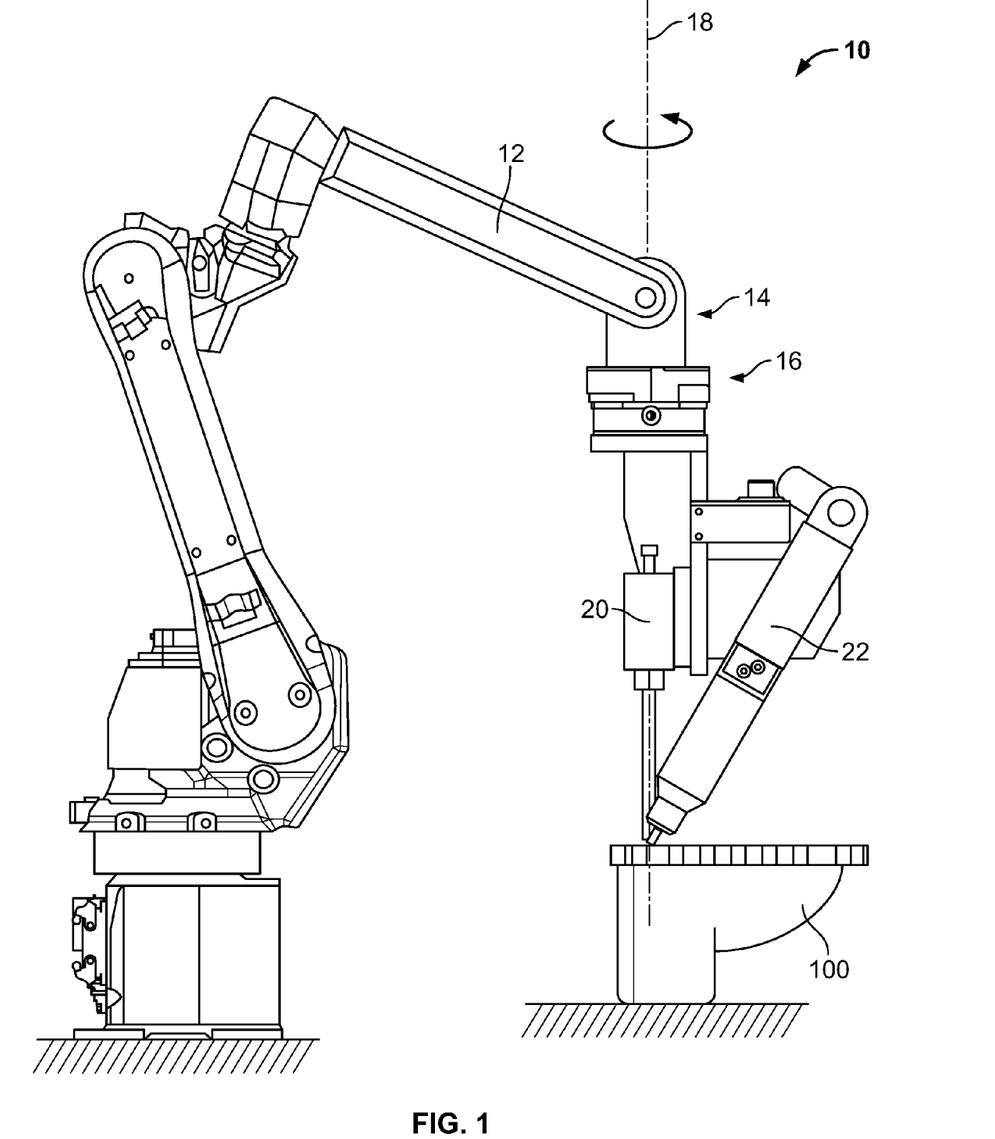
FIG. 1 is a side view of an example embodiment of an apparatus including a robotic arm and used to process an example work piece.

Referring now to FIG. 1, an example embodiment of an apparatus 10 used to process work pieces 100 is illustrated. The apparatus 10 may be part of an assembly line (not shown) that includes various types of robots for processing work pieces 100 which may be components that are assembled into completed goods. In order to provide the apparatus 10 with the mobility to handle the goods, the apparatus 10 may include a robotic arm 12 with joints that allow a distal end 14 of the robotic arm 12 to reach or extend to a range of areas around a work piece. For example, the robotic arm 12 may include a plurality of members that are rotatably coupled at the joints so as to be pivotable around a plurality of axes and may be configured as a 6-axis or 7-axis robot.

A variety of tools may be attached to the distal end 14 to perform a variety of processes on the work piece 100 such as transporting the work piece, inserting parts into the work piece, screwing/unscrewing, injecting material onto the work piece, or the like. The apparatus 10 may include a mounting assembly 16 that is attached to the distal end 14 of the robotic arm 12 in order to mount one or more tools on the distal end 14 of the apparatus 10. In the present embodiment, the apparatus 10 is configured to apply sealant on the work piece 100 and to clean a surface of the work piece 100 prior to applying the sealant. Moreover, the distal end 14 may be embodied as a substantially cylindrical part of the robotic arm 12 and may have an axis 18 around which the distal end 14 is rotatable with respect to the robotic arm 12. The mounting assembly 16 may be mounted to the distal end 14 so as to be rotatable around the axis 18. For example, the distal end 14 may include a gripping element while the mounting assembly 16 may include a gripped element that is engaged or becomes interlocked with the gripping element.

Figure 2:
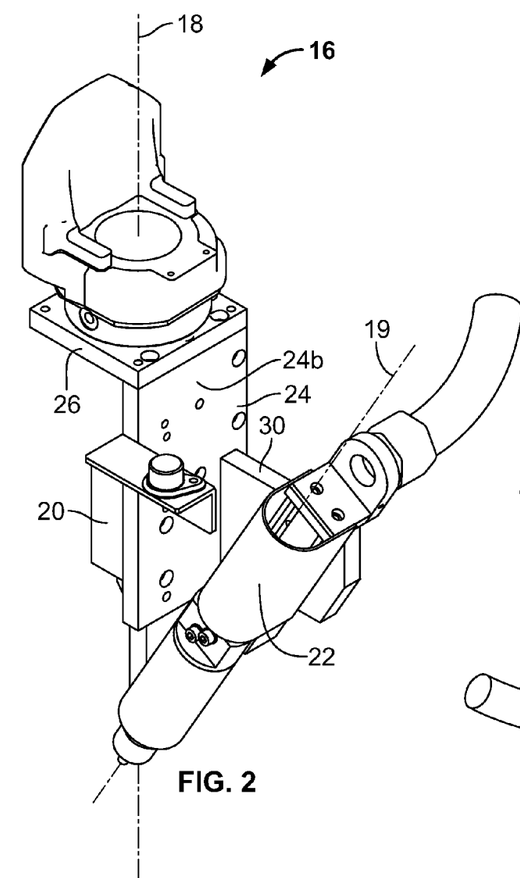
FIG. 2 is a perspective view of an example embodiment of a mounting assembly that is attached to a distal end of the robotic arm and includes a sealant discharger and a plasma discharger.

Furthermore, the mounting assembly 16 may allow a sealant discharger 20 and a plasma discharger 22 to be mounted to or dismounted from the distal end 14 and may include a variety of structures to align and maintain the sealant discharger 20 and the plasma discharger 22 in desired orientations. In the embodiment shown in FIGS. 2-5, the mounting assembly 16 includes a main plate 24, an end plate 26, a first mounting plate 28 and a second mounting plate 30. The distal end 14 may include an end face (not shown) on which the end plate 26 may be secured to. The main plate 24 may be oriented to be substantially perpendicular to the end plate 26 so as to be parallel to the axis 18. A gusset 32 may be used to strengthen the connection between the end plate 26 and the main plate 24. The sealant discharger 20 may be mounted near a first face 24a (FIG. 3) of the main plate 24 while the plasma discharger 22 may be mounted near a second face 24b (FIG. 2) of the main plate 24 that is opposite the first face 24a. The sealant discharger 20 may be attached on top of the first mounting plate 28 secured to the first face 24a of the main plate 24 as shown in FIG. 4. The plasma discharger 22 may be attached to a second mounting plate 30 that may be secured to the main plate 24 so as to project therefrom as shown in FIG. 2.

Figure 3:
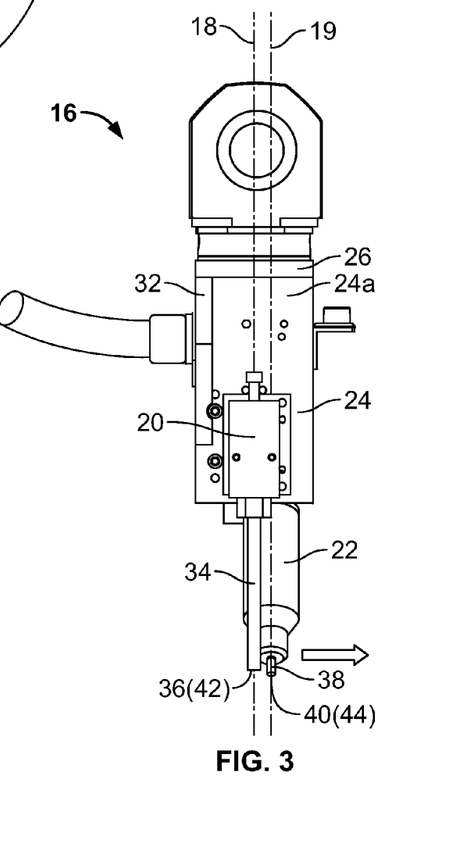
FIG. 3 is a first side view of the mounting assembly including the sealant discharger and the plasma discharger.
Figure 4:
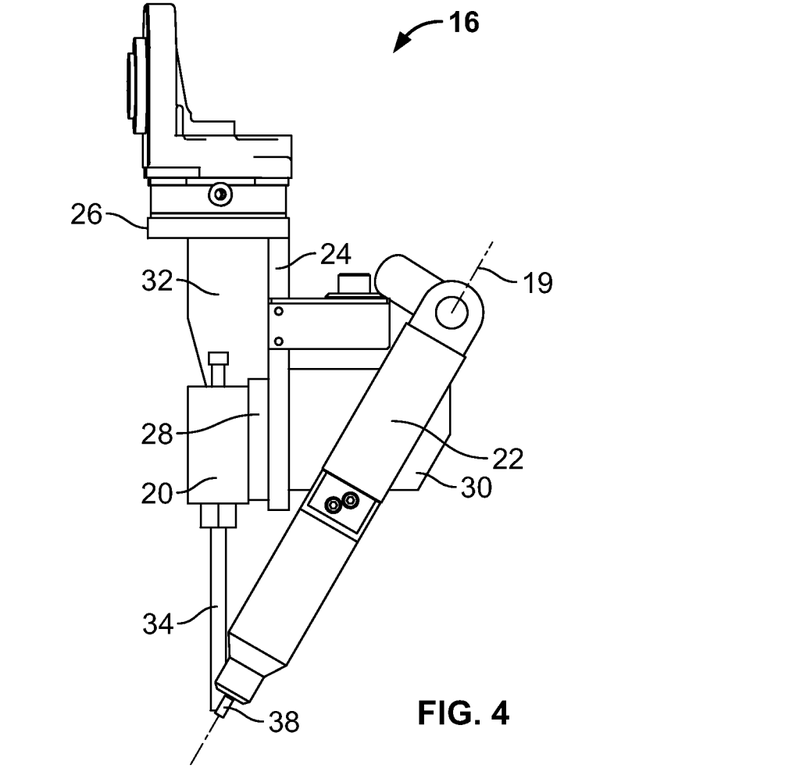
FIG. 4 is a second side view of the mounting assembly.
Figure 5:
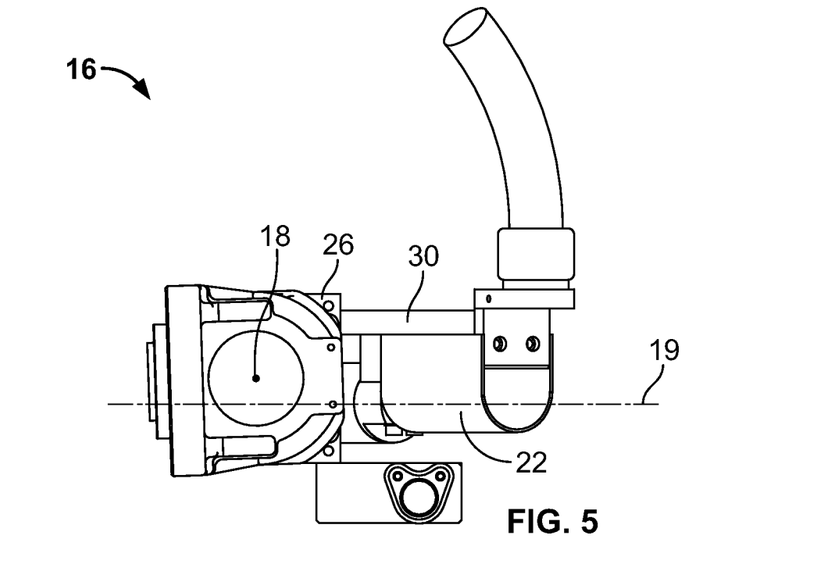
FIG. 5 is a top view of the mounting assembly.

As shown in FIGS. 3-4, the sealant discharger 20 may include a sealant nozzle 34 with a sealant outlet 36 at the end thereof and from which a type of sealant may be discharged onto a surface of the work piece 100. The sealant discharger 20 may thus be in fluid communication with a sealant tank (not shown) supplying the sealant as needed according to a sealant discharge controller (not shown). The sealant may be of a type suitable for adhering the assembled components onto each other. The sealant discharger 20 may be mounted on the distal end 14 so that a longitudinal axis of the sealant nozzle 34 is coaxially aligned with the axis 18 around which the distal end 14 is rotatable as shown in FIG. 1.

The plasma discharger 22 may include a plasma nozzle 38 with a plasma outlet 40 from which gas in a plasma state is discharged so as to remove impurities and contaminants from a surface of the work piece 100. The plasma discharger 22 may thus be in fluid communication with a gas tank (not shown) containing a type of gas that can be excited to a high energy, plasma state. The plasma may be supplied and discharged as needed according to a plasma discharge controller (not shown). The plasma discharger 22 may be mounted on the distal end 14 so that the plasma nozzle 38 is located a distance apart from the axis 18 of the distal end 14. In the present embodiment, the plasma discharger 22 is secured to the second mounting plate 30 so as to be at an angle relative to the sealant discharger 20.

Under the configuration shown in FIGS. 1-5, the sealant flows along the axis 18 of the distal end 14 and is also discharged along the axis 18 because the sealant nozzle 34 is longitudinally aligned with the axis 18 and the sealant outlet 36 is located on the axis 18. Thus, the sealant may be discharged along the axis 18 from a first point 42 positioned on the axis 18 as shown in FIG. 3. Moreover, the longitudinal axis 19 of the plasma nozzle 38 may be oriented to be at an angle relative to the axis 18 with which the sealant nozzle 34 is aligned and may also be a distance apart from the axis 18 such that the plasma outlet 40 is positioned at a second point 44 which is the same distance apart from the axis 18 (FIG. 3). As shown in FIGS. 2-5, the axis 18 to which the sealant nozzle 34 is aligned and the axis 19 to which the plasma nozzle 38 is aligned are oriented such that the axes 18, 19, and extensions thereof to, do not intersect. Because of the aforementioned arrangement of the sealant discharger 20 and the plasma discharger 22, the second point 44 can be rotated around the axis 18 or the first point 42 upon rotation of the distal end 14 around the axis 18. The first point 42 and the second point 44, which define discharge points for sealant and plasma respectively, are sufficiently in proximity to the surface of the work piece 100 so that the sealant and the plasma respectively are applied at the intended portions of the work piece 100.

Figure 6:
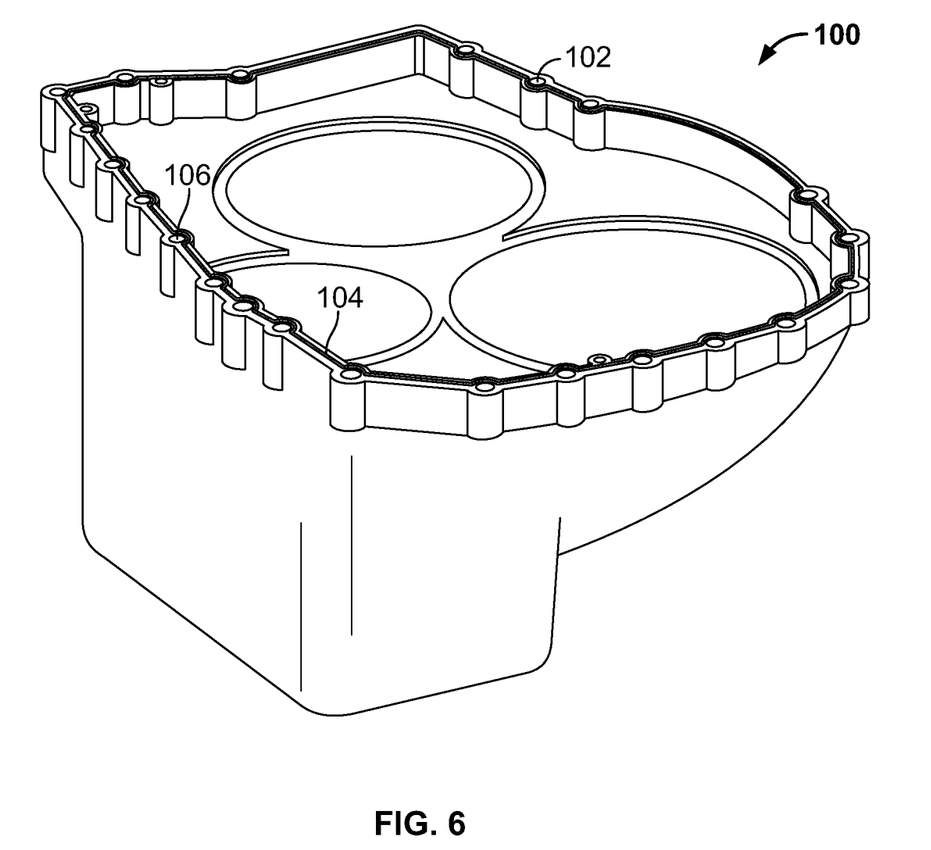
FIG. 6 is a perspective view of the work piece including a surface on which a predetermined path along which sealant is to be applied.
Figure 7:
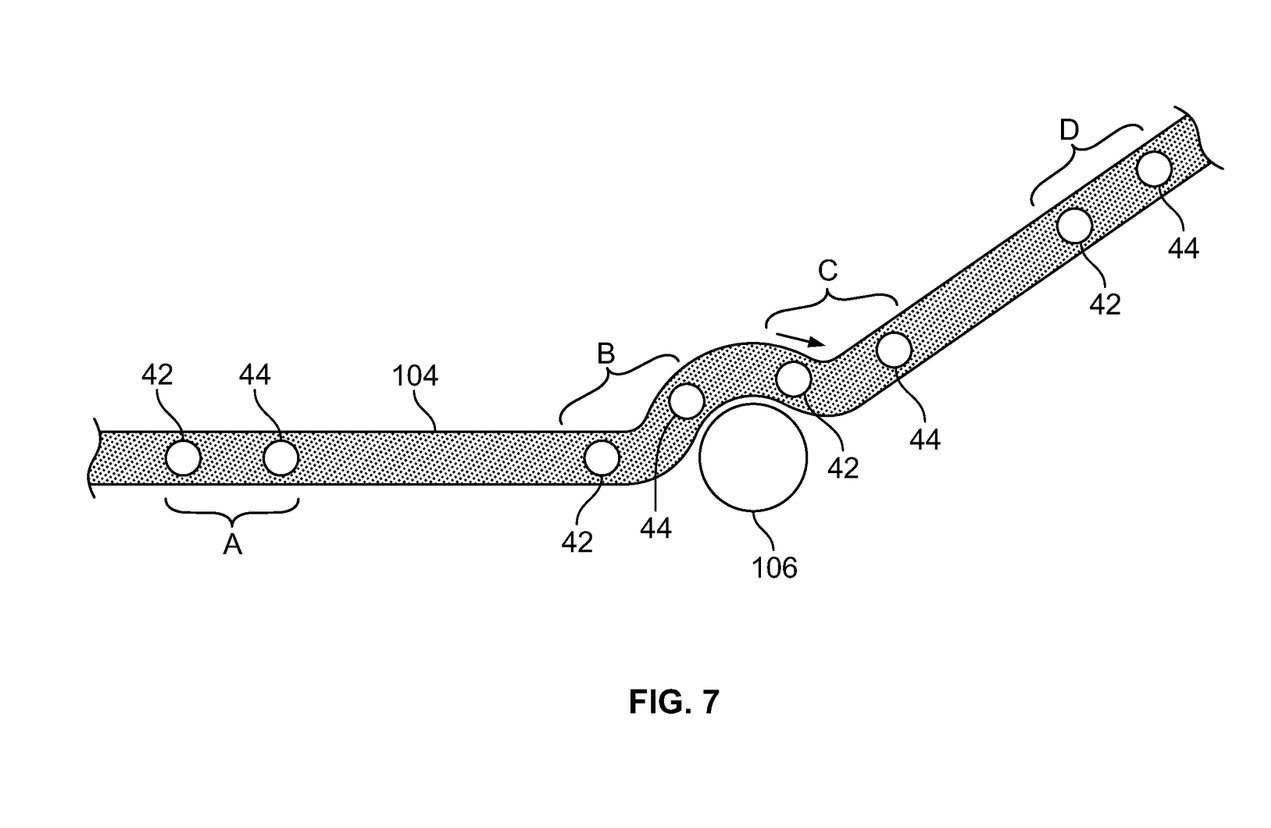
FIG. 7 is a schematic top, close up view of the surface showing the first point and the second point at multiple positions tracing the predetermined path.

Referring to FIGS. 6-7, the apparatus 10 can be controlled in the following manner to apply sealant on a surface 102 of a work piece 100 while cleaning the surface 102 by way of plasma prior to applying the sealant. An example of a work piece 100 that can be processed by the apparatus 10 is shown in FIG. 6 and may be a component for an engine block, for example. While the surface 102 of the work piece 100 may be flat as shown in FIG. 6 so as to lie in a plane, the surface 102 may also have three-dimensional surface textures and may include bumps, recesses, undulations or the like, for example. Moreover, the surface 102 may be located along the outer edges of the work piece 100 and may extend along a perimeter of the work piece 100 as shown in FIG. 6. The robotic arm 12 of the apparatus 10 can be programmed such that sealant is applied along a predetermined path 104 extending along the perimeter as shown in FIG. 6 on the surface 102 of the work piece 100. In the example work piece of FIG. 6, the predetermined path 104 is shaped to go around holes 106 formed for bolts/screws. Moreover, while the predetermined path 104 of FIG. 6 forms a closed loop, the predetermined path 104 may simply include a starting point and an end point.

In order to apply the sealant, the robotic arm 12 may be controlled such that both of the first point 42 and the second point 44 trace the predetermined path. In one example method of controlling the robotic arm 12, this may be accomplished by positioning the sealant discharger 20 and the plasma discharger 22 such that the axis 18 of the distal end 14 intersects the predetermined path 104 while maintaining the axis 18 at a substantially perpendicular orientation relative to the surface 102 of the work piece 100, moving the axis 18 along the predetermined path 104, and pivoting the second point 44 around the axis 18 or the first point 42 as the axis 18 is moving along the predetermined path 104 such that the second point 44 traces the predetermined path 104 as the first point 42 traces the predetermined path 104. FIG. 7 shows a plurality of positions A, B, C and D for the distal end 14 and the locations of the first point 42 and the second point 44 corresponding to each of these positions which are reached using the aforementioned steps. The term 'pivoting' is meant to be distinguished from the term 'rotating' in that pivoting involves movement of an element that is rotatable around an axis where the rotational direction is frequently changed whereas rotating involves movement of an element that is rotatable around an axis where the rotational direction is maintained in one direction. The second point 44 is pivoted around the axis 18 because, depending on the shape of the predetermined path 104, the rotational direction may need to be frequently altered in order for both of the first point 42 and the second point 44 to trace the predetermined path 104. The distance between the first point 42 and the second point 44 is sized to allow the first point 42 and the second point 44 to be simultaneously located on the predetermined path 104 as shown in FIG. 7. For example, when the first point 42 and the second point 44 are moving along a curved portion of the predetermined path 104 having a small radius of curvature, it may not be possible for both of the first point 42 and the second point 44 to be located on the predetermined path 104 if this distance is too large. However, the apparatus 10 may be configured such that the distance between the first point 42 and the second point 44 is adjustable depending on the curvatures of the predetermined path 104.

Because the sealant discharger 20 is mounted on the distal end 14 such that the first point 42 from which sealant is discharged is located on the axis 18, the movement of the axis 18 of the robotic arm 12 along the predetermined path 104 results in the first point 42 tracing the predetermined path 104 and application of the sealant along the predetermined path 104. Moreover, as the robotic arm 12 is moved such that the first point 42 from which sealant is discharged traces the predetermined path 104, the distal end 14 is pivoted as needed such that the second point 44 from which plasma is discharged traces the predetermined path 104 while moving ahead of the first point 42 during the entirety of the movement of the axis 18 along the predetermined path 104. In order for both the first point 42 and second point 44 to trace the predetermined path 104 as the distal end 14 is moved along the predetermined path 104, the distal end 14 may proceed in the direction of the arrow of FIGS. 3 and 7 when moving along the predetermined path 104. Because the second point 44 moves ahead of the first point 42 during the entirety of the predetermined path 104, plasma is discharged onto a part of the surface 102 before sealant is discharged on the same part and the discharged plasma does not burn off sealant that has already been applied and removes impurities, contaminants or the like from the surface to allow for more effective application of the sealant.

The apparatus 10 may be operated using a controller (not shown) that can be programmed to move the distal end 14 so that the first point 42 and the second point 44 trace the predetermined path 104. For example, an operator may move the distal end 14 such that the first point 42 and the second point 44 assume a plurality of positions (e.g., A, B, C and D in FIG. 7) along the predetermined path 104. The controller may be equipped with the capability to memorize the plurality of positions of the first point 42 and the second point 44 within the predetermined path 104 indicated by the operator and may interpolate other positions of the first point 42 and the second point 44 within the predetermined path 104 so as to move the distal end 14 so that the first point 42 and the second point 44 trace the predetermined path 104. A sufficiently high number of positions would need to be memorized by the controller in order to precisely trace the predetermined path 104. The apparatus 10 may be provided with an interface by way of which the operator can program the controller to memorize a plurality of positions of the distal end 14 along the predetermined path 104 with corresponding locations through which the first point 42 and the second point 44 need to move through (FIG. 7). After the controller has memorized the plurality of positions set by the operator, the remaining positions along the predetermined path 104 may be determined by the controller through interpolation and the robotic arm 12 operates to move the distal end 18 along the predetermined path 104.

Using the aforementioned method of controlling the robotic arm 12, it is easy to program the robotic arm 12 such that the predetermined path 104 is traced by the first point 42 because the first point 42 is located on the axis of the distal end 14 which is one of the axis 18 by which the movement of the robotic arm 12 is typically controlled and consequently the tracing of the predetermined path 104 by the first point 42 and the second point 44 is facilitated.

It will be apparent to those skilled in the art that various modifications and variations can be made without departing from the spirit and scope of the claimed apparatus or method.

What is claimed is:

1. A method of processing a work piece using a robotic arm, the robotic arm including a distal end that is rotatable with respect to an axis of the robotic arm, the robotic arm including a plasma discharger and a sealant discharger mounted to the distal end, the plasma discharger including a plasma outlet configured to discharge plasma, the sealant discharger including a sealant outlet configured to discharge sealant, the work piece including a surface, the method comprising:

positioning the plasma discharger and the sealant discharger such that the sealant outlet is located at a first point which is in proximity to the surface and the plasma outlet is located at a second point which is in proximity to the surface, the first point defining a discharge point for the sealant, the second point defining a discharge point for the plasma, wherein the first point is positioned on the axis of the robotic arm, and the second point is positioned on a longitudinal axis oriented to be at an angle relative to the axis of the robotic arm such that the longitudinal axis and the axis of the robotic arm and extensions thereof do not intersect;

moving the distal end that is rotatable with respect to the axis of the robotic arm, such that the axis is moved along a predetermined path on the surface while discharging sealant from the first point to apply sealant on the surface, wherein the surface has three-dimensional surface textures and the predetermined path is shaped in connection with the three-dimensional surface textures of the surface; and pivoting the distal end with respect to the axis of the robotic arm such that a rotational direction of the distal end changes based at least upon a shape of the predetermined path in connection with the three-dimensional surface textures of the surface as the second point traces the predetermined path during the moving while discharging the plasma such that the plasma is applied on the surface along the predetermined path, the second point tracing the predetermined path ahead of the first point along an entirety of the predetermined path, wherein the second point is configured to be located at an adjustable distance from the first point based at least on a curvature of the predetermined path.

2. The method of claim 1, wherein the surface is flat so as to lie in a plane.

3. The method of claim 2, wherein the axis of the robotic arm is oriented perpendicular to the surface.

4. The method of claim 1, wherein the sealant discharger is configured to discharge the sealant along the axis of the robotic arm.

5. The method of claim 1, wherein the surface extends along a perimeter of the work piece.

6. The method of claim 1, wherein the distance is sized to allow the first point and the second point to be located simultaneously on the predetermined path.

7. A method of processing a work piece including a surface, the method comprising:
discharging sealant from a first point positioned on an axis of a robotic arm that is oriented perpendicularly to the surface, the first point being in proximity to the surface such that the sealant is applied on the surface;
discharging plasma from a second point that is located a distance apart from the axis of the robotic arm, the second point being positioned on a longitudinal axis oriented to be at an angle relative to the axis of the robotic arm such that the longitudinal axis and the axis of the robotic arm and extensions thereof do not intersect, the second point being in proximity to the surface such that plasma is applied on the surface;
moving a distal end that is rotatable with respect to the axis of the robotic arm to move the axis while discharging the sealant, such that the sealant is applied on the surface along a predetermined path thereon, wherein the surface has three-dimensional surface textures and the predetermined path is shaped in connection with the three-dimensional surface textures of the surface; and
pivoting the distal end with respect to the axis of the robotic arm such that a rotational direction of the distal end changes based at least upon a shape of the predetermined path in connection with the three-dimensional surface textures of the surface as the second point discharges the plasma during the moving such that the second point is moved along the predetermined path and the plasma is applied on the surface along the predetermined path,
wherein the second point traces the predetermined path ahead of the first point along an entirety of the predetermined path, and the second point is configured to be located at an adjustable distance from the first point based at least on a curvature of the predetermined path.

8. The method of claim 7, further comprising channeling the sealant along the axis of the robotic arm prior to discharging the sealant.

9. The method of claim 7, wherein the surface extends along a perimeter of the work piece.

10. The method of claim 7, wherein the surface is flat so as to lie in a plane.

11. The method of claim 7, wherein the distance is sized to allow the first point and the second point to be located simultaneously on the predetermined path.

12. A method of processing a work piece using a robotic arm, the method comprising:
providing the robotic arm including a distal end that is rotatable with respect to an axis of the robotic arm, the robotic arm including a plasma discharger and a sealant discharger mounted to the distal end, the plasma discharger including a plasma outlet configured to discharge plasma while the plasma outlet is at a second point that is located a distance apart from the axis of the robotic arm, the sealant discharger including a sealant outlet configured to discharge sealant while the sealant outlet is at a first point, the sealant discharger mounted on the distal end such that the first point is located on the axis of the robotic arm, the work piece including a surface;
positioning the plasma discharger and the sealant discharger such that the sealant outlet is located at the first point which is in proximity to the surface and the plasma outlet is located at the second point which is in proximity to the surface, the first point defining a discharge point for the sealant, the second point defining a discharge point for the plasma, wherein the first point is positioned on the axis of the robotic arm, and the second point is positioned on a longitudinal axis oriented to be at an angle relative to the axis of the robotic arm such that the longitudinal axis and the axis of the robotic arm and extensions thereof do not intersect;
moving the distal end that is rotatable with respect to the axis of the robotic arm such that the axis is moved along a predetermined path on the surface while discharging sealant from the first point to apply sealant on the surface, wherein the surface has three-dimensional surface textures and the predetermined path is shaped in connection with the three-dimensional surface textures of the surface; and
pivoting the distal end with respect to the axis of the robotic arm such that a rotational direction of the distal end changes based at least upon a shape of the predetermined path in connection with the three-dimensional surface textures of the surface as the second point traces the predetermined path during the moving while discharging the plasma such that the plasma is applied on the surface along the predetermined path, the second point tracing the predetermined path ahead of the first point along an entirety of the predetermined path,
wherein the second point is configured to be located at an adjustable distance from the first point based at least on a curvature of the predetermined path.

13. The method of claim 12, wherein the robotic arm is configured to move the axis of the robotic arm along the predetermined path located on the surface of the work piece such that the first point traces the predetermined path.

14. The method of claim 13, wherein the distal end is configured to be pivoted such that the second point traces the predetermined path as the axis of the robotic arm is moved along the predetermined path and such that the second point traces the predetermined path ahead of the first point along an entirety of the predetermined path.

15. The method of claim 12, further comprising mounting the sealant discharger and the plasma discharger on a mounting assembly that is attached to the distal end.

16. The method of claim 12, wherein the sealant is configured to be discharged along the axis of the robotic arm.

17. The method of claim 12, wherein the surface extends along a perimeter of the work piece.

18. The method of claim 12, wherein the surface is flat so as to lie in a plane, and the axis of the robotic arm is oriented perpendicular to the surface.

19. The method of claim 12, wherein the distance is sized to allow the first point and the second point to be located simultaneously on the predetermined path.

20. The method of claim 12, further comprising:
determining a first plurality of positions for the first point and second point along at least a portion of the predetermined path; and
determining a second plurality of positions for the first point and second point along a remaining portion of the predetermined path based at least upon the first plurality of positions.

* * * * *